(12) United States Patent
Orgias (10) Patent No.: US 10,729,096 B2
(45) Date of Patent: Aug. 4, 2020

(54) INTERACTIVE AUTOMATIC KITTY LITTER BOX

(71) Applicant: Peter Orgias, Brooklyn, NY (US)

(72) Inventor: Peter Orgias, Brooklyn, NY (US)

( * ) Notice: Subject to any disclaimer, the term of this patent is extended or adjusted under 35 U.S.C. 154(b) by 106 days.

(21) Appl. No.: 14/998,336

(22) Filed: Jan. 4, 2016

(65) Prior Publication Data
US 2017/0188539 A1    Jul. 6, 2017

(51) Int. Cl.
*A01K 1/01*        (2006.01)
*A01K 29/00*    (2006.01)
*H01M 10/46*    (2006.01)
*H01M 10/48*    (2006.01)
*H04W 4/80*     (2018.01)
*H04M 1/725*   (2006.01)

(52) U.S. Cl.
CPC .......... *A01K 1/0107* (2013.01); *A01K 29/005* (2013.01); *H01M 10/465* (2013.01); *H01M 10/488* (2013.01); *H04W 4/80* (2018.02); *H01M 2220/10* (2013.01); *H04M 1/7253* (2013.01)

(58) Field of Classification Search
CPC ...... A01K 1/107; A01K 1/0117; A01K 1/011; A01K 1/0128; A01K 1/0132; A01K 1/0135; A01K 29/005; A01K 1/0139
USPC .................................. 119/165, 168, 163, 170
See application file for complete search history.

(56) References Cited

U.S. PATENT DOCUMENTS

| 3,316,880 | A | * | 5/1967 | Jungles | A01K 1/0107 119/163 |
|---|---|---|---|---|---|
| 3,482,546 | A | * | 12/1969 | Anderson | A01K 1/0114 119/166 |
| 5,279,258 | A | * | 1/1994 | Kakuta | A01K 1/0117 119/163 |
| 5,460,122 | A | * | 10/1995 | Reinartz | A01K 1/011 119/164 |
| 5,931,119 | A | * | 8/1999 | Nissim | A01K 1/0114 119/163 |
| 6,176,201 | B1 | * | 1/2001 | Fields | A01K 1/0107 119/163 |
| 6,561,131 | B1 | * | 5/2003 | Schwartz | A01K 1/011 119/161 |
| 6,701,868 | B1 | * | 3/2004 | Shepherd | A01K 1/0114 119/161 |
| 7,000,569 | B2 | * | 2/2006 | Markowitz | A01K 1/0107 119/165 |
| 7,424,867 | B2 | * | 9/2008 | Kates | A01K 15/021 119/719 |
| 8,061,300 | B2 | * | 11/2011 | McElroy, Jr. | A01K 1/0107 119/164 |
| 8,316,801 | B1 | * | 11/2012 | Nottingham | A01K 1/0117 119/169 |
| 8,408,160 | B1 | * | 4/2013 | Pozin | A01K 1/011 119/170 |
| 8,797,166 | B2 | * | 8/2014 | Triener | G01G 17/08 119/421 |

(Continued)

*Primary Examiner* — Tien Q Dinh
*Assistant Examiner* — Ebony E Evans

(57) ABSTRACT

An automatic interactive kitty litter box includes a base; a removable base pan; a sensor that activates a retractable cover to protect contents of the automatic interactive kitty litter box; LEDs; a rotational energy connecting element; a motor; a cover; a key pad; a solar material; a small led screen; a video screen; BLUETOOTH or WIFI; a camera; a thermometer; a weight scale; and an outer housing.

19 Claims, 10 Drawing Sheets

COVER OPEN

COVER CLOSED (56) References Cited

U.S. PATENT DOCUMENTS

| | | | | |
|---|---|---|---|---|
| 8,817,000 B1* | 8/2014 | Sauvage | ............... | G06F 1/28 |
| | | | | 345/207 |
| 2003/0051672 A1* | 3/2003 | Gordon | ............ | A01K 1/0114 |
| | | | | 119/166 |
| 2007/0051031 A1* | 3/2007 | Allen | ............ | A01K 97/05 |
| | | | | 43/54.1 |
| 2007/0125306 A1* | 6/2007 | Beecher | ........... | A01K 5/0142 |
| | | | | 119/51.02 |
| 2011/0315084 A1* | 12/2011 | Miller | ............ | A01K 1/011 |
| | | | | 119/166 |
| 2014/0311414 A1* | 10/2014 | Morris | ............ | B32B 7/00 |
| | | | | 119/161 |
| 2017/0124264 A1* | 5/2017 | Jordan | ......... | G06K 19/07758 |

\* cited by examiner

COVER OPEN

COVER CLOSED

INTERACTIVE AUTOMATIC KITTY LITTER BOX

BACKGROUND

Field of Invention

This invention relates to kitty litter boxes, specifically to such kitty litter boxes which are used for pets to use to bathroom.

Description of Prior Art

Pet owners have commonly allowed their pets to use the bathroom by a kitty litter box. Such kitty litter boxes have been used by pet owners.

Originally kitty litter boxes just stored pet excrements leaving them open for insects and other pest drawn to it through the smell. This can cause health and sanitary issues for both the pet and the pet owners.

Thus if a pet is done with using the bathroom the current kitty litter boxes have no interactive abilities and cannot be accessed remotely through computer and cell phones. In addition the kitty litter boxes of today cannot take the temperature and weight of their pets.

OBJECTS AND ADVANTAGES

Accordingly, besides the objects and advantages of the cover described in my above patent, several objects and advantages of the present invention are:

(a) to provide a cover which can be produced in a variety of colors;

(b) to provide cover whose production allows for a convenient and extremely rapid pace.

(a) to provide a cover which keeps smells down, etc.;

(b) to provide an interaction by the user;

Further objects and advantages are to provide a kitty litter box which can be used easily and conveniently automatically to allow for pets to use the bathroom, which the user can interface with via computer, and cell phone, which gives the user the ability to open, close ect., via the computer and cell phone, which can allow for the user to look in on their pet, and see their pet via video screen, allowing for the user's pet to see their owner or vise versa. Still further objects and advantages will become apparent from a consideration of the ensuing description and drawings.

| Reference Numerals In Drawings | |
|---|---|
| 2 | base |
| 4 | removable base pan |
| 5 | sensor |
| 6 | leds |
| 7 | rotational energy connecting element |
| 8 | motor |
| 9 | cover |
| 11 | key pad |
| 14 | speaker |
| 18 | small led screen |
| 19 | video screen |
| 20 | bluetooth wi fi |
| 21 | camera |
| 14 | microphone speaker |
| 34 | weight scale |
| 33 | thermometer |
| 35 | outter housing |
| 15 | solar material |

DESCRIPTION—FIGS. 1 TO 8

Figure 1:
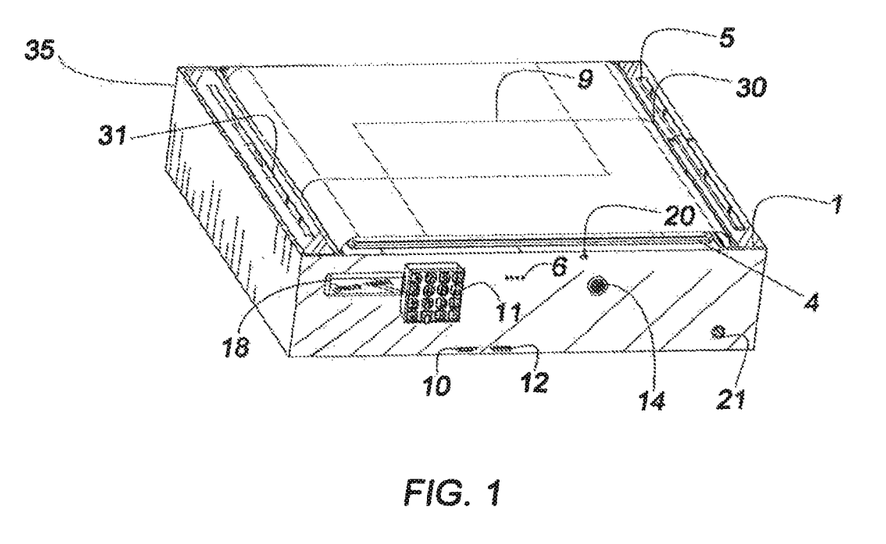
FIG. 1 is a front view perspective of the automatic interactive kitty litter box 4 according to the present invention.
Figure 2:
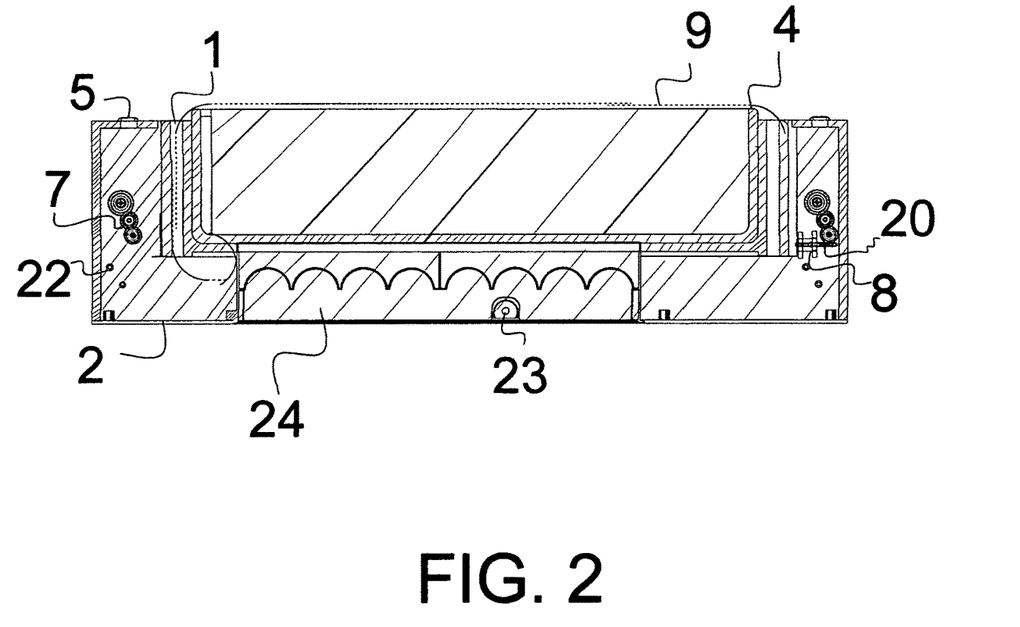
FIG. 2 is a cross-sectional view of the automatic interactive kitty litter box 4 of FIG. 1.
Figure 3:
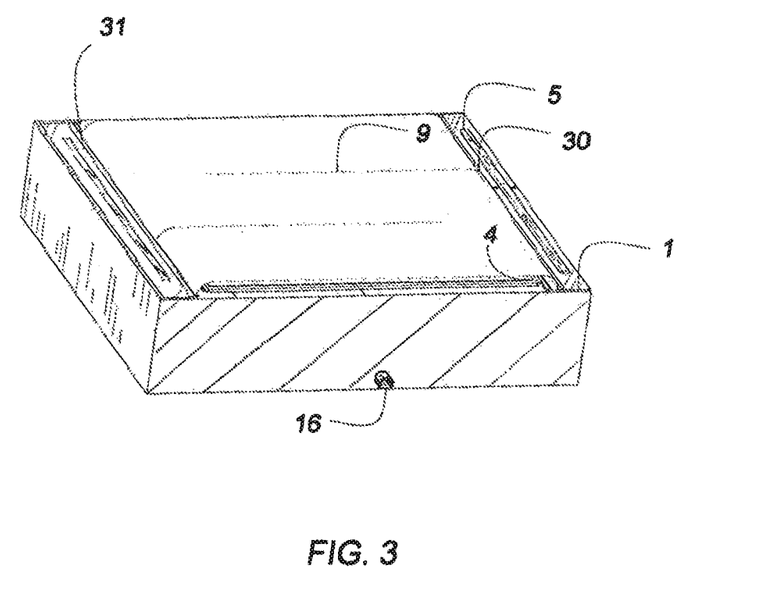
FIG. 3 is a rear view of the automatic interactive kitty litter box 4 of FIG. 1.
Figure 4:
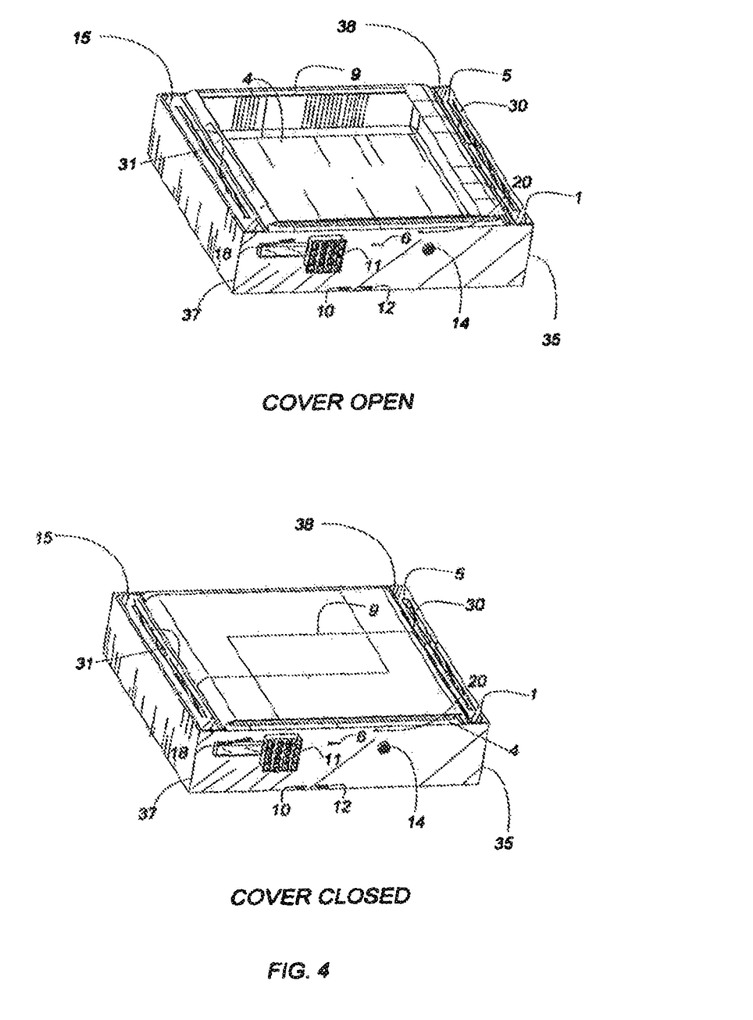
FIG. 4 is a front view of automatic interactive kitty litter box 4 of FIG. 1.
Figure 5:
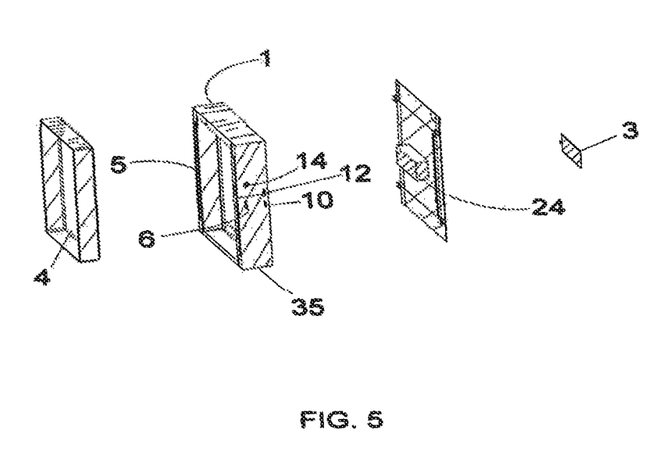
FIG. 5 is an exploded view of the automatic interactive kitty litter box with removable base pan 4.
Figure 6:
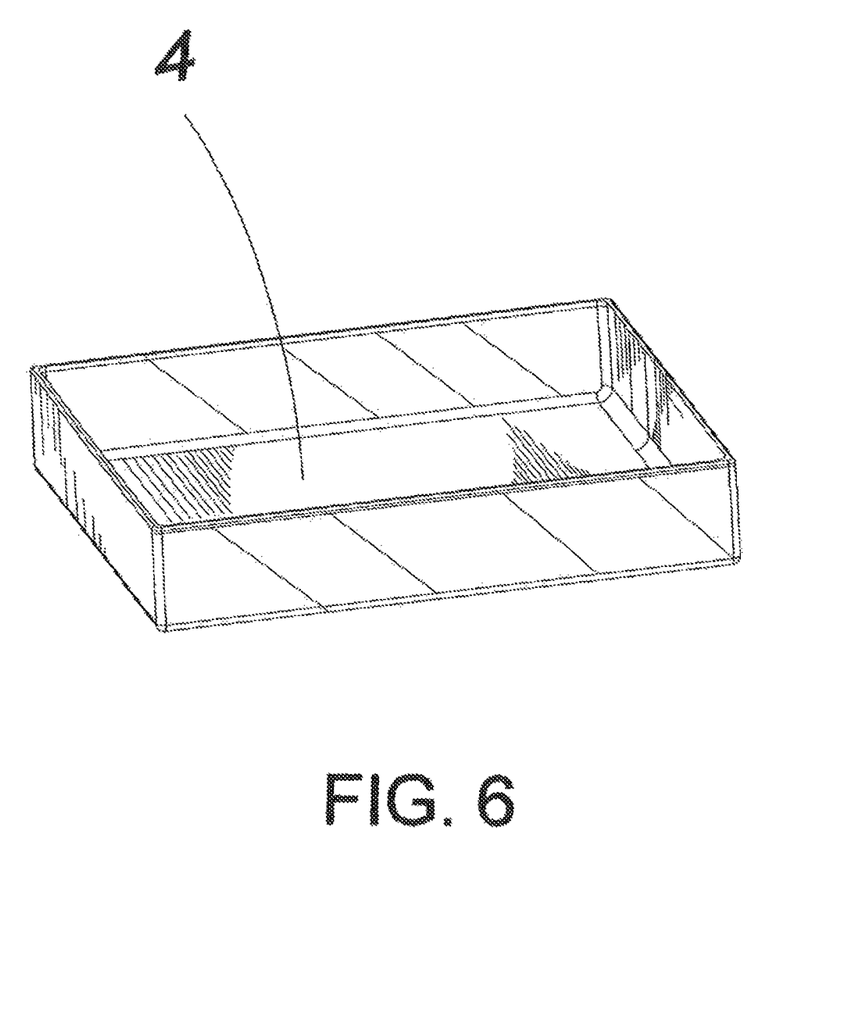
FIG. 6 is a front view of the kitty litter box removable kitty litter removable base pan 4.

A typical embodiment of the automatic interactive kitty litter box of the present invention has a removable litter base pan 4 that once the motion sensor 5 is activated the cover 9 retracts revealing the base pan 4 for your pets' use, the cover 9 covers the base pan 4 then after a period of time retracts back covering over the automatic interactive kitty litter box base pan 4. The cover 9 in combination with a horizontal plurality of elongated support members of substantially approximate lengths and is operated by a motor 8 which spins the rotational energy connecting element 7 whereby retracting the cover 9. The automatic interactive kitty litter box outer housing 35 body 1 has a slit 30, 31 for the cover 9 that works in combination having a sensor 5, motor 8 with the rotational energy connecting element 7 for providing a continuous variable speed and power drive for coupling rotational energy from said motor mechanism to the horizontal plurality of elongated support members of substantially approximate lengths of said unit whereby the automatic interactive kitty litter box 4 reduces odors until the owner is ready to change the automatic interactive kitty litter box base pan 4. Whereby the automatic interactive kitty litter box allows your pet to open his or her own automatic interactive kitty litter box by sniffing, tail wagging, touching etc.; the sensor face 5 as approximately shown may vary. When the automatic interactive kitty litter box is not in use for an approximate time the retractable cover 9 will automatically cover the kitty litter base pan 4 until your pet is ready to use it. The said unit in combination can be programmed by said key pad buttons 11 that whereby allowing the said unit to be set remotely to open and close at approximate desired times. Whereby the led screen 18 show programmed key pad button 11 commands and may vary in shape size and color. Solar material 15 used to provide solar energy to charge up the said unit. Whereby the battery charge indicator 17 shows the said unit is charging and may have audible sound and blink and change to a different color when charged. When the said unit is charged the said unit may run only on the plug adapter (for example, power adapter interface plug area 23 of FIG. 2) until unplugged and also may store the energy to run without a power plug adapter. Said unit may have an approximate audible beep and visual indicator to indicate said units' power level whereby the user will also be notified via specified software and specified cell phone apps if the user never responds after an approximate time period the unit will open as the user has designated. The automatic interactive kitty litter box, led 6 indicate the said units' mode, each mode is representative to an approximate colored led. The said unit may use various approximate batteries having battery housing area 24 and battery cover 3 of FIG. 5 in combination to other approximate various power sources whereby the said unit may use other energy sources such as solar may store the energy to run, power plug adapter etc. The user can record their voice, music, etc., and replay the recording at designated times whereby their pet feels comfortable when the owner is away from home. Whereby the user may record their voice directly onto the said unit and change the message; send the message recording via specified mobile cell phone apps, programs, WIFI, BLUETOOTH, or said technologies. In combination the microphone 14 is spoken into the said unit then records a message of the user, whereby which plays back when the said unit is activated by your pet. The said units' interaction with specified cell phone apps, programs, WIFI, BLUETOOTH, or said technologies whereby that may remotely operate, activate and program, the said unit. The user may program the time the said unit activates, which is great for pet owners, trainers, breeders, animal doctors etc. The said unit in combination having a pet camera 21 whereby to allow the user to look in on their pet. In examples of the present disclosure, the automatic interactive kitty litter box further comprises an On/Off switch 10 (FIGS. 1, 4 and 5), a colored LED 12 (FIGS. 1, 4 and 5), a battery charge plug 16 (FIG. 3) and stability rods 22 (FIG. 2).

Figure 7:
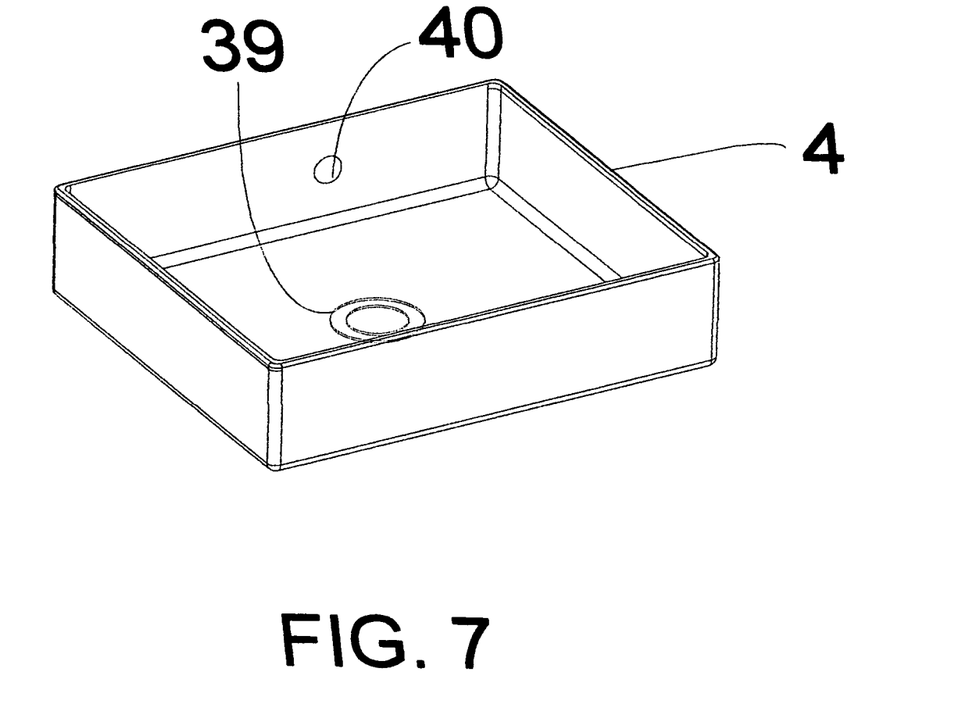
FIG. 7 is a front view of the automatic interactive kitty litter box base pan 4 with the removable base pan 4 and the weight scale 39 and the temperature thermometer 40.
Figure 8:
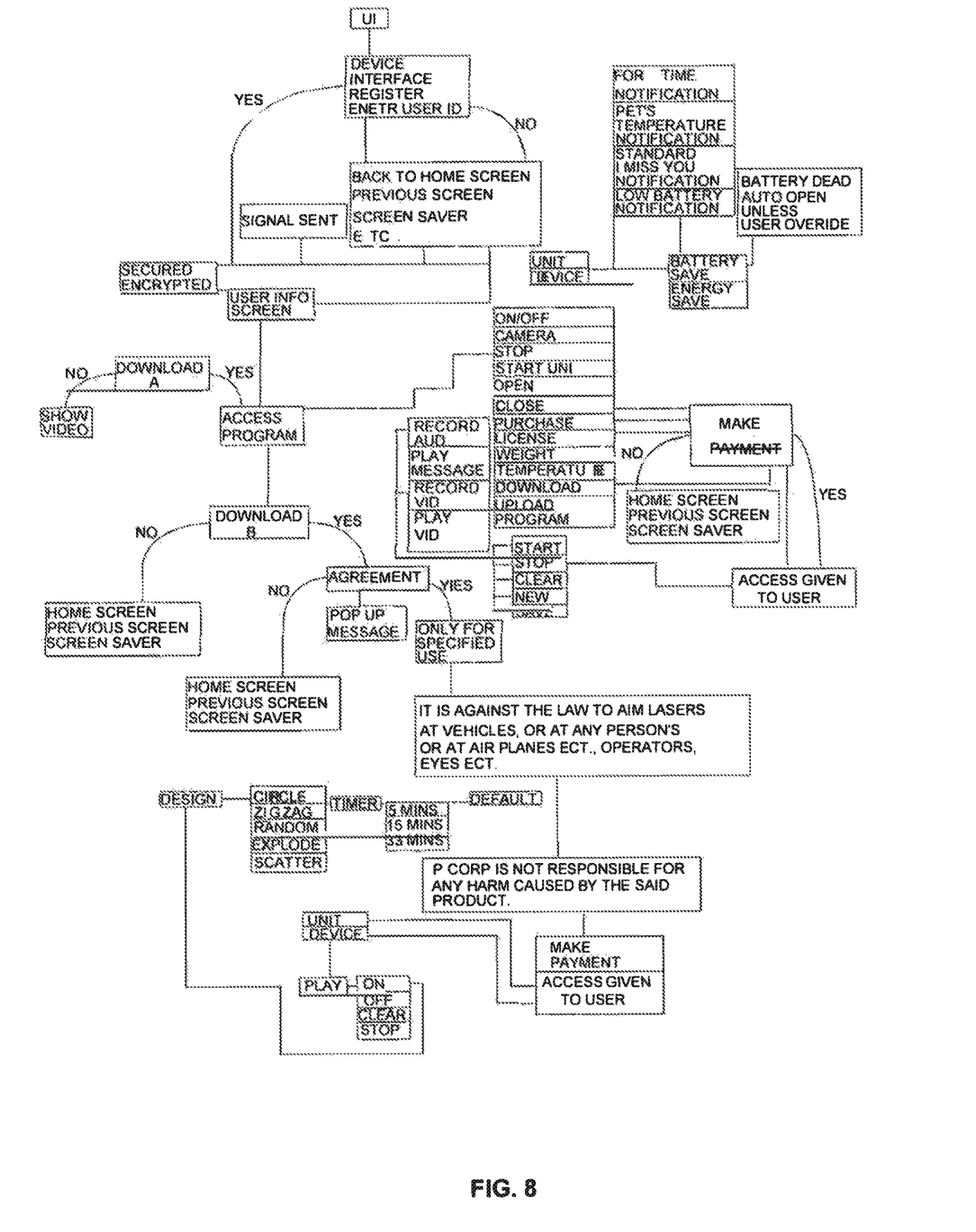
FIG. 8 is a flow chart
Figure 9:
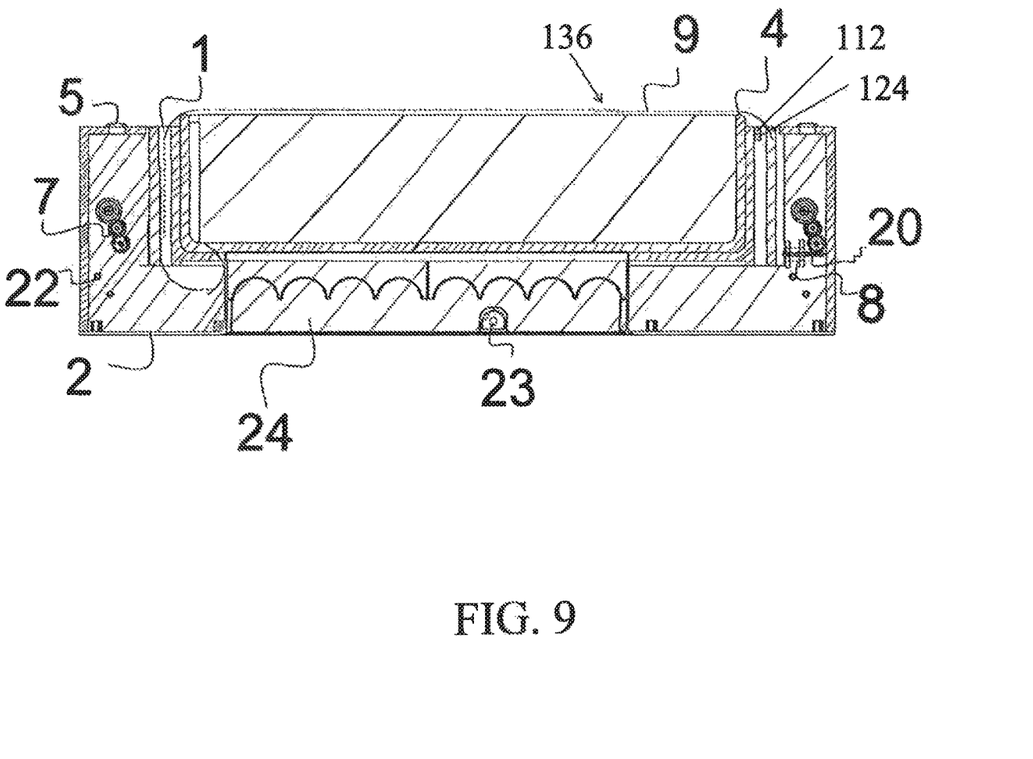

The said unit base pan (4) FIG. 7 in combination having weight scale technology whereby detecting your pet's approximate weight, body temperature to help gauge and track your pet's health via the said unit in combination and with specified computer software, or specified phone app, etc.

Figure 10:
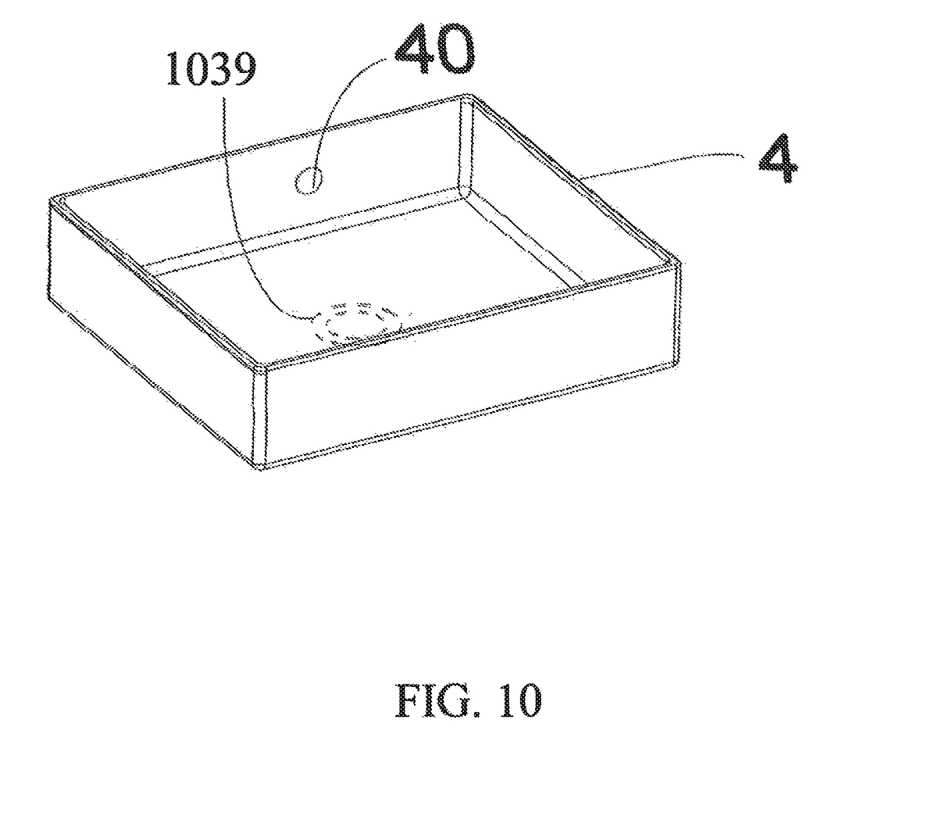

The said unit base pan 4 may have a weight scale 39 that is located on the bottom or the underside (see weight scale 1039 of FIG. 10 shown in dashed lines) of the base pan 4 whereby your pet's weight is recorded and can be viewed by the user.

The weight scale 39 may give your pets weight which is great for pet owners, trainers, animal doctors etc.

The built in thermometer 40 may give your pet's approximate temperature.

Summary, Ramifications, And Scope

Accordingly, the reader will see that the housing of the automatic interactive kitty litter box of this invention can be. In addition, when the user may want they may interface the automatic interactive kitty litter box via their computer, cell phone app etc. In addition the user may view on the video screen comforting their pets remotely. In addition the user may speak through the speaker directly to their pet. The user may record their message and set it to play whenever the user may desire which is great for animal trainers, veterinarians, pet housing facilities. This is good for controlling your pet's bathroom habits and watching out for pet weight gain thus giving the pet a better quality of life. Furthermore, the cover helps pet owners keep a sanitary house and keep an eye on their pets, regulate bathroom usage for their pets at designated times.

The automatic interactive kitty litter box has additional advantages in that the housing may rotate epicyclic whereas revealing the opening;
the housing may rotate horizontal whereas revealing the opening;
the housing may trochoid;
the housing may be on a tram;

The housing slit 30, 31 may have a flexible apron 124 on the underside of the cornice 112. A first end portion of the retractable cover 9 overlaps a second end portion of the retractable cover 9 so as to form an overlapped portion 136 above an opening of the base pan 4.

the housing flexible doctor blade may be setaceous;
the housing may have a ribband;
the housing may have a gland;
the size of the housing of the automatic interactive kitty litter box may be larger or smaller;
the color of the housing of the automatic interactive kitty litter box may vary;
the cover 9 may be rigid and soft flexible, may be link, nano wall etc.;
the shape of the housing of the automatic interactive kitty litter box may vary;
the material of the housing of the automatic interactive kitty litter box may vary.
the housing of the automatic interactive kitty litter box may be one piece or separate sections;
the housing of the automatic interactive kitty litter box may be made of material that glows;
a connecting rod may secure the gears;
connecting rods may secure the gears;
The unit may be interactive without cover 9 wherein the user can interface with said unit by means of camera 21 via computer and cell phone app.
The unit may be interactive without cover 9 wherein the user can interface with said unit by means of video screen 19 via computer and cell phone app.
The unit may be interactive without cover 9 wherein the user can interface with said unit by means of key pad 11 via computer and cell phone app.
The unit may be interactive without cover 9 wherein the user can interface with said unit by means of BLUETOOTH of WIFI 20 via computer and cell phone app.
The shape of the weight scale may vary
The area where the weight scale is placed may vary
The means by which the temperature thermometer may operate may vary
The base pan 4 may be built into the housing.
The unit may not use a plug in adapter.
The unit may not use batteries.

Although the description above contains many specificities, these should not be construed as limiting the scope of the invention but as to merely providing illustrations. For example, the housing can have other shapes, such as circular, oval, trapezoidal, triangular, etc.; the slit can be replaced by a hinge which connects two otherwise unconnected halves of the cover etc.

Thus the scope of the invention should be determined by the appended claims and their legal equivalents, rather than by the examples given.

The invention claimed is:

1. An automatic interactive kitty litter box comprising
an outer housing comprising
a base; and
a retractable cover;
a base pan configured to be placed in the outer housing;
a sensor attached to the outer housing, the sensor activating the retractable cover to protect contents of the base pan of the automatic interactive kitty litter box;
LEDs attached to the outer housing;
a rotational energy connecting element;
a motor driving the rotational energy connecting element and the retractable cover;
a key pad attached to the outer housing;

a solar material attached to the outer housing;
an LED screen attached to the outer housing;
a video screen attached to the outer housing;
a camera attached to the outer housing;
a thermometer attached to the base pan; and
a weight scale attached to the base pan;
a first slit and a second slit spaced apart on a top wall of the outer housing;
wherein the first slit and the second slit are parallel to an edge of a top surface of the top wall of the outer housing; and
wherein the automatic interactive kitty litter box is characterized by
a first condition in which
a first portion of the retractable cover retracts from a position above the first slit, through the first slit, and then to a position below the first slit;
a second portion of the retractable cover retracts from a position above the second slit, through the second slit, and then to a position below the second slit; and
the base pan is exposed; and
a second condition in which
the retractable cover covers the base pan.

2. The automatic interactive kitty litter box of claim 1 further comprising a battery charge indicator.

3. The automatic interactive kitty litter box of claim 2, wherein the base pan is a removable litter base pan;
wherein the automatic interactive kitty litter box is characterized by
a first condition in which the sensor is activated so that the retractable cover retracts and the base pan is exposed for a pet's use; and
a second condition in which the retractable cover covers the base pan after a period of time from the first condition.

4. The automatic interactive kitty litter box of claim 3 further comprising a plurality of horizontal, elongated support members of a substantially similar length and a first slit and a second slit spaced apart on a top wall of the outer housing;
wherein the plurality of horizontal, elongated support members are operated by the motor so as to spin the rotational energy connecting element and to retract the retractable cover.

5. The automatic interactive kitty litter box of claim 4, wherein the automatic interactive kitty litter box is programmed by key pad buttons of the key pad so as to allow the automatic interactive kitty litter box to be controlled remotely and to open and close the retractable cover at desired times.

6. The automatic interactive kitty litter box of claim 5, wherein the battery charge indicator shows different colors corresponding to different charge levels.

7. The automatic interactive kitty litter box of claim 6, wherein a user is notified if the user does not respond after a time period.

8. The automatic interactive kitty litter box of claim 7, wherein the LEDs indicate modes of the automatic interactive kitty litter box;
wherein each mode is represented by a respective colored LED of the LEDs;
wherein the automatic interactive kitty litter box uses batteries, solar, and power plug adapter as energy sources;
wherein the user records voice and music and replay the voice and music at designated times by a speaker; and
wherein the user sees the pet through the camera.

9. The automatic interactive kitty litter box of claim 8, wherein the weight scale is located at an underside of a bottom of the base pan.

10. The automatic interactive kitty litter box of claim 9, wherein the outer housing is made of polypropylene.

11. The automatic interactive kitty litter box of claim 1, wherein the automatic interactive kitty litter box is characterized by the second condition in which a first end portion of the retractable cover overlaps a second end portion of the retractable cover so as to form an overlapped portion above an opening of the base pan.

12. The automatic interactive kitty litter box of claim 11, wherein the automatic interactive kitty litter box is characterized by the second condition in which a plurality of top surfaces of a plurality of side walls of the base pan are higher than a plurality of top surfaces of a plurality of side walls of the outer housing and the plurality of the top surfaces of the plurality of the side walls of the base pan are lower than the overlapped portion of the cover.

13. The automatic interactive kitty litter box of claim 12, wherein the weight scale is located at an underside of a bottom of the base pan and the thermometer is located at a side wall of the base pan.

14. The automatic interactive kitty litter box of claim 12, a first flexible apron is directly attached to an underside of a cornice of the first slit and a second flexible apron is directly attached to an underside of a cornice of the second slit.

15. An automatic interactive kitty litter box comprising
an outer housing comprising
a base;
a retractable cover; and
a first slit and a second slit spaced apart on a top wall of the outer housing;
a base pan configured to be placed in the outer housing;
a sensor attached to the outer housing;
a rotational energy connecting element;
a motor driving the rotational energy connecting element and the retractable cover,
wherein the first slit and the second slit are parallel to an edge of a top surface of the top wall of the outer housing; and
wherein the automatic interactive kitty litter box is characterized by
a first condition in which
a first portion of the retractable cover retracts from a position above the first slit, through the first slit, and then to a position below the first slit;
a second portion of the retractable cover retracts from a position above the second slit, through the second slit, and then to a position below the second slit; and
the base pan is exposed; and
a second condition in which
the retractable cover covers the base pan.

16. The automatic interactive kitty litter box of claim 15, wherein the automatic interactive kitty litter box is characterized by the second condition in which a first end portion of the retractable cover overlaps a second end portion of the retractable cover so as to form an overlapped portion above an opening of the base pan.

17. The automatic interactive kitty litter box of claim 16, wherein the automatic interactive kitty litter box is characterized by the second condition in which a plurality of top surfaces of a plurality of side walls of the base pan are higher than a plurality of top surfaces of a plurality of side walls of the outer housing and the plurality of the top surfaces of the plurality of the side walls of the base pan are lower than the overlapped portion of the cover.

18. The automatic interactive kitty litter box of claim 17, wherein a weight scale is located at an underside of a bottom of the base pan and a thermometer is located at a side wall of the base pan.

19. The automatic interactive kitty litter box of claim 17, wherein the retractable cover is rigid or flexible.

* * * * *